April 22, 1941.　　　A. F. O'CONNOR　　　2,239,113
CUSHIONING DEVICE
Filed March 27, 1939　　　2 Sheets-Sheet 2
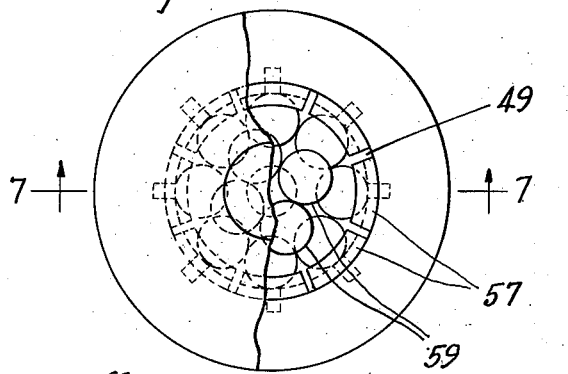
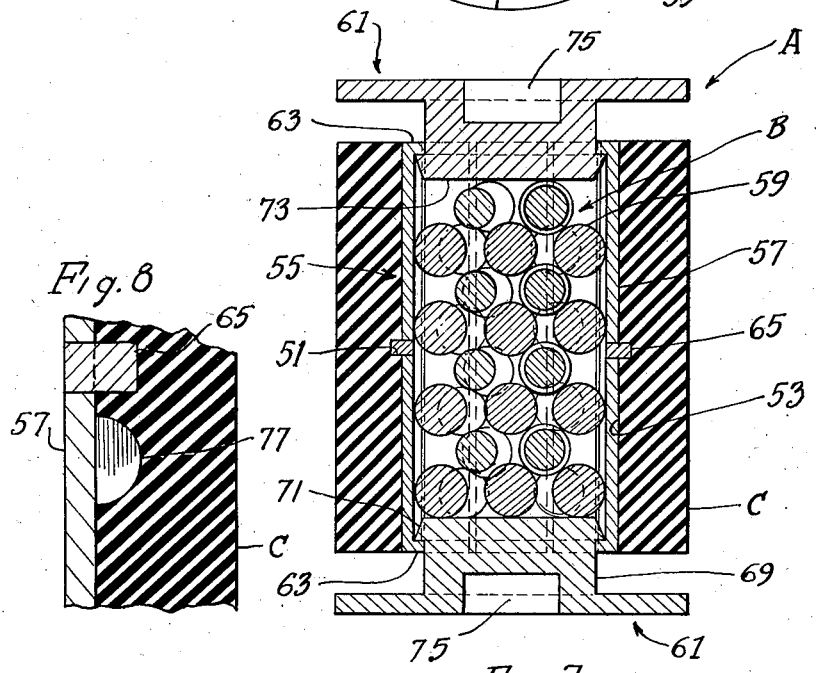
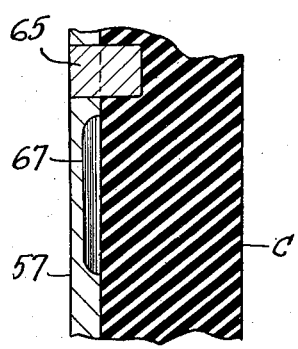
Inventor:
Arthur F. O'Connor Patented Apr. 22, 1941

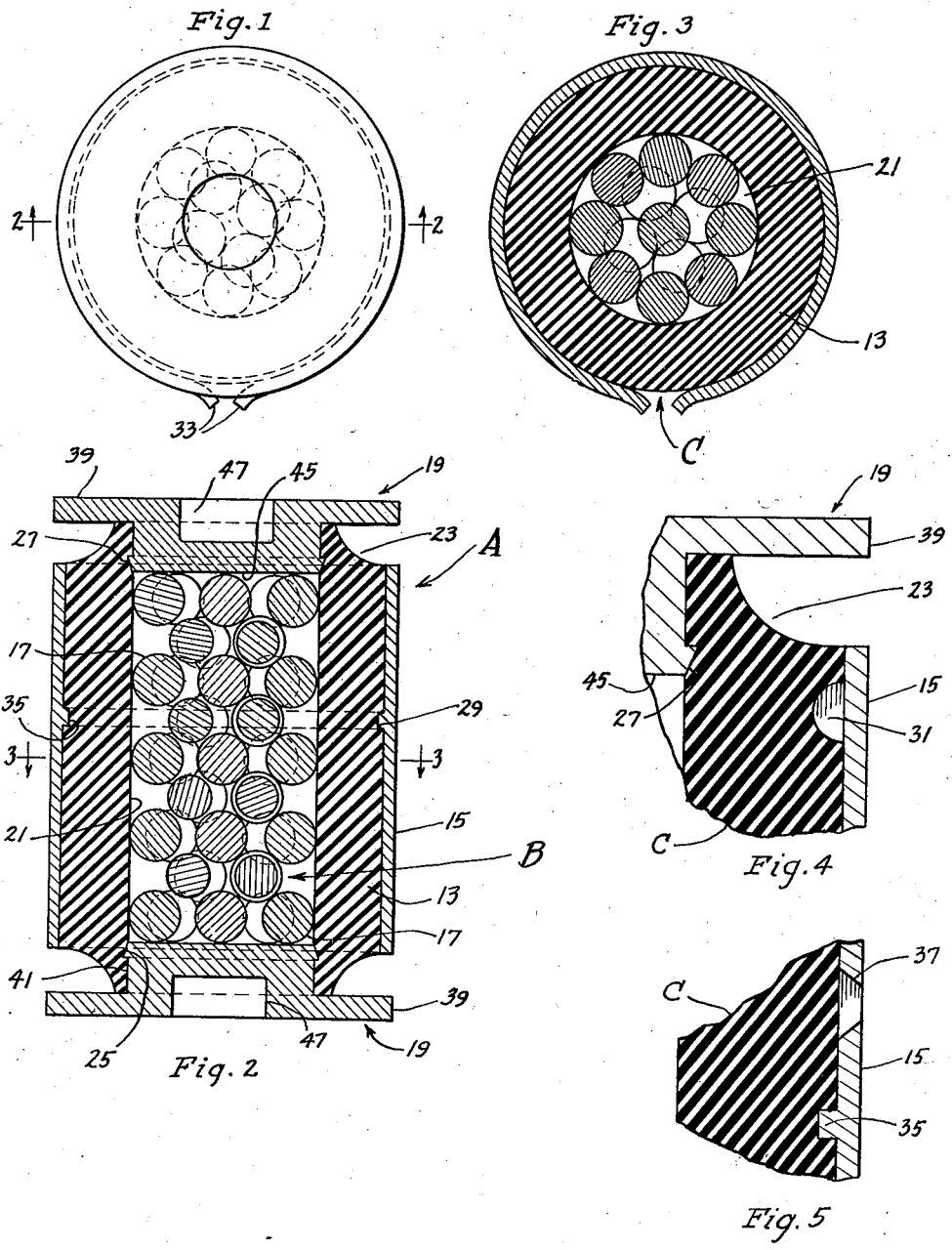

2,239,113

UNITED STATES PATENT OFFICE 2,239,113

CUSHIONING DEVICE

Arthur F. O'Connor, Chicago, Ill., assignor to Union Asbestos & Rubber Company, Chicago, Ill., a corporation of Illinois Application March 27, 1939, Serial No. 264,391

21 Claims. (Cl. 267—9)

This invention relates in general to cushioning devices and more particularly to a device for shock absorbing purposes in vehicles, the invention being particularly well adapted for use in combination with the conventional coil springs in railway car trucks.

An object of the invention is to provide an improved cushioning device of great strength and simplicity and particularly well adapted for use in vehicle suspensions in combination with coil springs, to prevent the building up of harmonics during the operation of the coil springs, which are responsible for "bouncing" of the vehicle at certain critical car speeds and attendant damage to lading and car parts.

Another object is the provision of a new and improved cushioning device embodying friction elements and having novel means for holding the component parts in assembled position.

Another object of the invention is the provision of an improved cushioning device in which the resistance of the device to compression may be varied to accommodate light or heavy loads carried in the vehicle.

Another object is the provision of an improved cushioning device embodying friction elements comprising a plurality of confined balls; a further object being to arrange the balls in a series of stacked layers; a still further object being to stagger or offset the balls in adjacent layers; and yet a further object being to confine the stack of balls within a sheath of yielding material.

To illustrate my device I have shown in the drawings a cushioning device A embodying a plurality of friction elements B, arranged preferably in a stack and confined in a yieldable casing C, whereby said stack of friction elements may be compressed longitudinally in order to provide progressively varying resistance to compression as the device is progressively compressed.

In the accompanying drawings:

Fig. 1 is a plan view of one form of my invention while Fig. 2 is a vertical section taken on line 2—2 of Fig. 1.

Fig. 3 is a transverse sectional view taken on line 3—3 of Fig. 2 while Figs. 4 and 5 are enlarged fragmentary sections of modified casing C and its embracing member, respectively.

Fig. 6 is a plan view of a modification of my device with a portion of one of the members broken away to more clearly illustrate the construction. Fig. 7 is a vertical section taken on line 7—7 of Fig. 6 while Figs. 8 and 9 are enlarged fragmentary sections of modified casing C and the segmental casing, respectively.

In the form of device illustrated in Figs. 1, 2 and 3 I show the casing C as a cylindrical member 13 which may be made of rubber, a yieldable cylindrical member 15 which may be made of spring steel and which may embrace the outer wall of member 13 in the assembled device. The friction elements preferably comprise a plurality of ball-like members 17 disposed within the member 13 and which I show, in Fig. 2, as comprising a stack of ball-like elements 17 extending longitudinally of member 13. The elements 17 are confined within member 13 by means of end members 19 cooperatively secured to the end portions of member 13.

The resilient member 13 may comprise a cylindrical member which I prefer to make of rubber with a preferably centrally located bore or aperture 21 extending longitudinally therethrough. The end portions of member 13 may be provided with a peripheral recessed or relieved portion 23, adapted to allow the rubber to flow when the device is compressed, without cutting the rubber by adjacent members 15 and 19. Member 13 may also be provided adjacent its end portions with an annular groove or recess 25 in the wall of aperture 21 adapted for lockingly engaging a portion 27 of end member 19 in assembled position. Member 13 may be provided intermediate its ends with an annular recess 29 adapted to secure member 15 against longitudinal movement with respect to member 13 in the assembled device. Member 13 may be provided with peripheral cavities or apertures 31 as a means of allowing the rubber to flow adjacent its abutment with member 15.

Yieldable member 15 may comprise a cylindrical casing which I prefer to make of spring steel having longitudinally extending marginal portions 33 in adjacent, parallel and preferably spaced apart relationship with each other and may be provided intermediate its end portions with an annular, inwardly and laterally extending rib portion 35, adapted for interlocking engagement with recess 29 of member 13. The marginal portions 33 of member 15 may be curved outwardly whereby a suitable spreading tool may be inserted between marginal portions 33 when it is desired to increase the diameter of member 15, as when inserting member 13 during assembly of the device. Member 15 may be provided with cavities or apertures 37 to allow the rubber to flow adjacent its abutment with member 13.

The friction elements 17 may comprise metal ball-like members, such as ball bearings, and may be made of any suitable material having the required hardness and wearing qualities and I prefer to dispose the elements 17 within the aperture 21 of member 13 in layers, as best illustrated in Fig. 2 of the drawings. I prefer to dispose elements 17 in alternate layers having an equal number of elements therein, with intermediate layers having a different number of elements therein.

The end members or follower plates 19 may comprise plate portions 39 having laterally projecting and preferably circular portions 41 adapted for telescoping engagement with the end portions of member 13 and which may be provided with a peripheral flange portion 27 adapted for interlocking engagement with recess 25 of member 13. Flange portion 27 may have its peripheral wall portion inwardly inclined toward end wall 45 of member 41 to facilitate the forcing of member 41 into aperture 21. Member 19 may be provided with a suitable cavity 47 to accommodate the spring centering boss on the conventional spring plate used on car trucks.

In the modification of my invention shown in Figs. 6 and 7 of the accompanying drawings I show the resilient casing C which may be cylindrical in form, with a preferably centrally located bore or aperture 49 extending longitudinally therethrough and which may be provided with cavities or pockets 51 intermediate its ends and extending inwardly and laterally of the wall portion 53 of aperture 49. A segmental, preferably metal lining 55 may be provided in adjacent, abutting relationship with wall portion 53 and may comprise a plurality of circularly arranged segments 57 extending longitudinally of casing C, and having means associated therewith to prevent longitudinal movement of segments 57 with relation to member C.

A column or stack of ball-like elements 59 may be confined within the segmental lining 55, in axial alignment therewith. End members or follower plates 61 may be provided adjacent the ends of segmental lining 55 adapted for interlocking engagement therewith.

Segments 57 may comprise elongated members, arcuate in cross section, extending longitudinally of member C and terminating adjacent their end portions in laterally extending flange portions 63, adapted for interlocking engagement with end portions of follower plates 61. Segment 57 may be provided, intermediate its ends, with a laterally and outwardly extending dowel-like member 65 adapted for interlocking engagement with a cavity 51 of member C, and may be provided with pockets or apertures 67 (as shown in Fig. 9) to allow the rubber to flow adjacent abutment of member C with segment 57.

Follower plates 61 may be provided with laterally projecting portions 69 adapted for telescoping engagement with end portions of segments 57 and which may be provided with a peripheral flange portion 71 adapted for abutting engagement with flange portions 63 of segment 57, to limit the relative movement of follower plates 61 away from each other. Flange portion 71 may have its peripheral wall portion inwardly inclined toward its end wall 73 to facilitate the forcing of member 61 into segmental lining 55. Member 61 may be provided with a cavity 75 to accommodate the spring centering boss on the conventional spring plate used on car trucks. Member C may be provided with cavities or relieved portions 77 to allow the rubber to flow adjacent abutment of segment 57 with member C.

While I show, in Fig. 2, a laterally extending rib portion 35 on member 15 it will be apparent that dowel-like members 65 may be substituted therefor, in which case pockets 51 may be substituted for recess 29 of member 13. The use of dowel-like members 65 will provide for the making of member 15 from stock shapes which may be preferred from standpoint of cost.

The yieldable member 15 may be omitted from the device shown in Fig. 2 if it is desired to decrease the resistance of the device to compressive forces but I prefer its use as it acts to limit the relative movement of the end members 19 toward each other. Yieldable member 15 may be added to the device shown in Figs. 6 and 7 as means for increasing the resistance of the device to compressive forces.

While the ball-like elements 17 and 59 are shown in predetermined positions I contemplate their use in general massed formation, but I prefer to dispose them within their confining members in a series of stacked layers. It will be apparent that a variation in the resistance of my device to compressive forces may be obtained by varying the diameters of the ball-like elements or by increasing the inside diameter of the confining member.

While I have shown my device as being generally circular in configuration the shape of the several members may be changed without departing from the scope of my invention but I prefer to make the device of generally cylindrical form in order that one or more of my devices may be substituted for standard coil springs in the conventional nest of springs as used in car trucks, without requiring any changes in the associated standardized parts.

Upon compression of the device shown in Figs. 1 and 2 the ball-like members 17 adjacent resilient member 13 will be forced outwardly of the column of ball-like members and into member 13, and the rubber may flow inwardly toward said column, intermediate alternate layers of members 17. As the compression of the device takes place the members 17 may change their relative positions and it will be apparent that the said change in position of members 17 can not take place without setting up friction between adjacent members 17.

When the device, as shown in Figs. 6 and 7, is compressed the ball-like members 59 are forced outwardly against segmental lining 55 which, in turn, are forced into resilient member C. As compression progresses the members 59 will change their relative positions, thereby setting up friction between adjacent members 59 and between members 59 and adjacent segments 57.

While I have illustrated and described the preferred embodiment of my invention the same is merely illustrative and I contemplate all changes and modifications which come within the scope of the appended claims.

I claim:

1. In a cushioning device, a plurality of ball-like elements, and resilient confining means supporting said elements in a column.

2. In a cushioning device, a plurality of friction elements, resilient confining means comprising a sleeve of rubber-like material supporting said elements in a column, and a pair of followers.

3. In a cushioning device, a plurality of friction elements, resilient confining means comprising a sleeve of rubber-like material supporting said elements in a column, a pair of followers having laterally projecting portions adapted for cooperative engagement with said confining means.

4. In a cushioning device, a plurality of friction elements, resilient confining means supporting said elements in a column, a pair of followers having laterally projecting portions adapted for cooperative engagement with said confining means, said projecting portions having laterally extending peripheral flange portions adapted for interlocking engagement with said confining means.

5. In a cushioning device, a plurality of friction elements, and resilient confining means comprising a tubular member of rubber-like material supporting said elements in a column.

6. In a cushioning device, a plurality of friction elements, resilient confining means supporting said elements in a column, said confining means comprising a tubular member of resilient material, and a retaining member embracing said tubular member.

7. In a cushioning device, a plurality of friction elements, resilient confining means supporting said elements in a column, said confining means comprising a tubular member of resilient material, and a retaining member embracing said tubular member comprising a tube-like member of relatively rigid material.

8. In a cushioning device, a plurality of friction elements, resilient confining means supporting said elements in a column, said confining means comprising a tubular member of resilient material, a retaining member embracing said tubular member comprising a tube-like member of relatively rigid material having adjacent marginal portions extending substantially longitudinally of said confining means.

9. In a cushioning device, a plurality of friction elements, resilient confining means supporting said elements in a column comprising a tubular member, and a metal lining intermediate said column and said tubular member.

10. In a cushioning device, a plurality of friction elements, resilient confining means supporting said elements in a column comprising a tubular member, and a segmental metal lining intermediate said column and said tubular member.

11. In a cushioning device, a plurality of friction elements, a tubular resilient confining means supporting said elements in a column, and a segmental metal lining intermediate said column and said confining means comprising a plurality of elongated members, arcuate in cross section, extending longitudinally of said confining means and having their longitudinal margins in parallel adjacent relationship.

12. In a cushioning device, opposed followers, an interposed substantially cylindrical resilient member having a longitudinally extending apertured portion therein, a column of ball-like friction members within said apertured portion in coaxial alignment with said followers, said resilient member having a recessed portion in the wall of said apertured portion, said followers having laterally projecting portions adapted for telescoping engagement with the ends of said resilient member and provided with peripheral flange portions adapted for interlocking engagement with said recessed portion.

13. In a friction device, a pair of opposed followers, an interposed resilient member having an apertured portion, a column of ball-like elements within said apertured portion in axial alignment with said resilient member, a yieldable annular member adapted to embrace a transverse peripheral wall portion of said resilient member.

14. In a resilient device, the combination with relatively movable follower members; of a segmental casing interposed between said follower members in axial alignment therewith, said follower members having laterally extending portions thereon adapted for interlocking, telescoping engagement with said casing, a tubular resilient member embracing the outer walls of said casing, a column of ball-like members confined within and extending longitudinally of said casing intermediate said follower members.

15. In a resilient device, the combination with relatively movable follower members; of a substantially cylindrical segmental casing interposed between said follower members in axial alignment therewith, said follower members having laterally extending portions thereon adapted for interlocking, telescoping engagement with said casing, a tubular resilient member embracing the outer walls of said casing, a column of ball-like members confined within said casing, intermediate said follower members, said casing comprising a plurality of longitudinally extending segments, arcuate in cross section, and having their longitudinal marginal portions in adjacent parallel relationship with the longitudinal marginal portions of adjacent segments.

16. The resilient device construction of claim 15 in which the laterally extending portions of the follower members have peripheral flange portions adjacent their end walls and the segments are provided with inwardly extending end flanges adapted for abutting engagement with said peripheral flange portions to limit the movement of said follower members away from each other.

17. The resilient device construction of claim 15 in which the resilient member is provided adjacent its inner wall with recessed portions and the segments are provided with outwardly and laterally extending members adapted to be received in interlocking engagement with said recessed portions to prevent longitudinal movement of said segments with relation to the abutting resilient member.

18. In a friction device, a pair of followers, an interposed substantially cylindrical member of resilient material having a longitudinally extending apertured portion therein, a plurality of ball-like members confined in longitudinally extending columnar formation within said apertured portion and disposed in superposed layers of said ball-like members extending transversely of said cylindrical member.

19. In a cushioning device, a pair of opposed followers, an interposed substantially cylindrical resilient member having a longitudinally extending apertured portion therein, a column of ball-like friction members within said apertured portion in axial alignment with said followers, a yieldable annular member embracing a transverse peripheral wall portion of said resilient member and adapted to limit the movement of said followers toward each other, said resilient member having a peripheral recessed portion, said annular member having a laterally and inwardly extending member adapted for interlocking engagement with said recessed portion whereby said annular member is held against longitudinal movement with relation to adjacent outer wall of said resilient member.

20. In a cushioning device, a pair of followers, an interposed tubular resilient member, a plurality of ball-like members confined within said resilient member in stacked formation, a tubular annular retaining member of relatively rigid material embracing a transverse peripheral wall portion of said resilient member adapted for abutting engagement with said followers to limit their movement toward each other, said resilient member being longer than said retaining member when the device is not under compression and having a peripheral relieved portion adjacent each of its ends to prevent the end portions of said resilient member from entering between said followers and the end portions of said retaining member while the device is being compressed.

21. In a cushioning device, a plurality of friction elements supportably confined in different planes by and within the bore of a tubular member of yieldable rubber-like material.

ARTHUR F. O'CONNOR.